April 25, 1933.                  P. LOFGREN                     1,905,115
                        SEATING RING FOR PIPE COUPLINGS
                              Filed Feb. 6, 1931
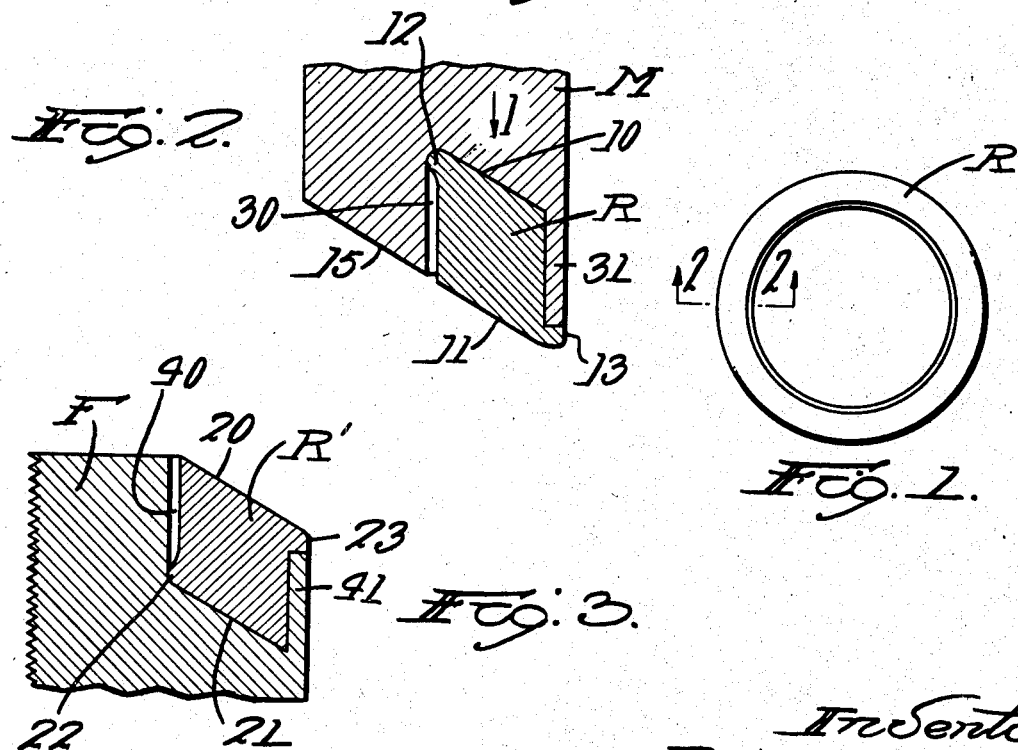

Patented Apr. 25, 1933

1,905,115

UNITED STATES PATENT OFFICE

PETER LOFGREN, OF WORCESTER, MASSACHUSETTS, ASSIGNOR TO ROCKWOOD SPRINKLER COMPANY OF MASSACHUSETTS, OF WORCESTER, MASSACHUSETTS, A CORPORATION OF MASSACHUSETTS

SEATING RING FOR PIPE COUPLINGS

Application filed February 6, 1931. Serial No. 514,018.

This invention relates to a seating ring for pipe couplings. Heavy pipe couplings are desirably made of steel but the contacting faces of the coupling members should be of non-corrosive material.

It is the object of my present invention to provide an improved seating ring for such purposes, which is of novel construction and increased utility and which can be very firmly secured against displacement.

My invention further relates to arrangements and combinations of parts which will be hereinafter described and more particularly pointed out in the appended claim.

Two forms of the invention are shown in the drawing, in which:

Fig. 1 is a plan view of one form of my improved seating ring;

Fig. 2 is an enlarged sectional view thereof, taken along the line 2—2 in Fig. 1;

Fig. 3 is a similar view of a second embodiment of my invention, and

Fig. 4 is a detail sectional elevation of a pipe coupling showing the utility of my improved seating rings when in use.

I will first describe the seating ring R shown in Figs. 1 and 2 and which is used in a male coupling member. This ring R is formed from non-corrosive metal and is in a single continuous piece, with inwardly and downwardly beveled upper and lower surfaces 10 and 11 (as viewed in Fig. 2), an outwardly projecting bead 12 at its upper outer edge or corner, and an inwardly projecting bead or rib 13 at its lower inner edge or corner.

Such a ring has been found to be of great utility when inserted in the contacting face 15 of a male pipe coupling member M of the general type shown in Fig. 4.

The ring R' shown in Fig. 3 is of substantially similar construction but modified to adapt the ring R' for use in a female coupling member. The ring R' is provided with upper and lower beveled surfaces 20 and 21 downwardly and inwardly inclined (as viewed in Fig. 3), and also with outer and inner beads or lips 22 and 23, similar to the beads 12 and 13 in the ring R but reversely disposed with respect to the surfaces 20 and 21.

In the ring R', the inner bead or lip 23 is at the upper inner corner of the ring, adjacent the lower edge of the beveled upper surface 20, while the outer bead 22 is at the outer lower corner of the ring, adjacent the upper edge of the lower beveled surface 21.

The use and utility of the rings is evident from inspection of Fig. 4, which shows the ring R mounted in a male coupling member M and the ring R' mounted in a female coupling member F.

In assembling the parts, each ring R is placed in a recess 30 of the associated male coupling member M, with a retaining portion or inner wall 31 at the inside of the ring R. The parts are then subjected to a press operation by which they are forced into the dove-tailed locking relation shown in Fig. 4, with the inner bead or lip 13 of the ring overlapping the retaining wall 31 of the coupling member and thereby increasing the non-corrosive contacting end surface of the coupling member M.

Similarly, each ring R' is seated in a recess 40 in the beveled end of an associated female coupling member F and is secured therein by a similar press operation, with the bead or lip 23 of the ring R' overlapping the corresponding retaining wall 41 of the coupling member F.

The dove-tailed engagement of the parts in both the male and female coupling members effectively prevents displacement of the rings R and R' relatively to the members M and F.

Having thus described my invention and the advantages thereof, I do not wish to be limited to the details herein disclosed, other- wise than as set forth in the claim, but what I claim is:—

A seating ring for a pipe coupling member comprising a ring of non-corrosive metal adapted to be permanently embedded in the engaging face of said coupling member, said ring having a lip projecting substantially radially inward at its lower inner corner and having a bead projecting substantially radially outward at its upper outer corner and having substantially parallel conical upper and lower faces.

In testimony whereof I have hereunto affixed my signature.

PETER LOFGREN.